United States Patent

[11] 3,611,004

[72] Inventors Lawrence Edward Smith; Anibal Mayor, both of Indianapolis, Ind.

[21] Appl. No. 851,652
[22] Filed Aug. 20, 1969
[45] Patented Oct. 5, 1971
[73] Assignee RCA Corporation

[54] BILATERAL PINCUSHION CORRECTION CIRCUIT
10 Claims, 9 Drawing Figs.

[52] U.S. Cl. .......... 315/27 SR
[51] Int. Cl. .......... H01j 29/70
[50] Field of Search .......... 315/27 SR

[56] References Cited
UNITED STATES PATENTS
3,346,765 10/1967 Barkow .......... 315/27 SR

*Primary Examiner*—Rodney D. Bennett, Jr.
*Assistant Examiner*—Joseph G. Baxter
*Attorney*—Eugene M. Whitacre

ABSTRACT: A bilateral pincushion correction circuit utilizes a two window saturable reactor having a control winding wound on a center leg and serially coupled to the vertical deflection windings of a television receiver and outer windings wound in series relation to one another on outer legs and parallelly coupled to the horizontal deflection winding of a television receiver. Current from the horizontal deflection generator flows in the outer windings to induce a flux of horizontal frequency ($f_h$) alternately poled at the vertical deflection rate and varying in magnitude in the control winding. This induced flux produces a voltage which is applied to an impedance network and lags the induced current in the control winding. The impedance network coupled to the control winding further provides isolation and independence of control between top and bottom and side pincushion adjustments. A series resonant circuit tuned to $f_h$ and coupled in parallel relation to the control winding develops a top and bottom pincushion correction voltage which is applied to the vertical deflection winding. Current flowing in the vertical deflection winding and through the control winding varies at the vertical deflection frequency ($f_v$) and effects a change of inductance of the outer windings at a frequency $f_v$ to produce a side pincushion correction.

INVENTORS
Lawrence Edward Smith and
Anibal Mayor
BY Eugene M. Whitacre
ATTORNEY

INVENTORS
Lawrence Edward Smith and
Anibal Mayor
BY Eugene M. Whitacre
ATTORNEY

BILATERAL PINCUSHION CORRECTION CIRCUIT

The present invention relates to television receiver scanning systems and, more particularly, to a circuit for correcting raster distortion.

The geometry of a television picture tube is such that the center of curvature of the face of the tube and the electron beam deflection center do not coincide. For a pleasing television picture, it is desirable to have a screen (tube face) that is relatively flat and rectangular, thus its radius of curvature is rather long. Size requirements, however, restrict the location of the electron gun and deflection center within the picture tube to a distance much closer to the tube face. This is especially true in modern wide angle picture tubes. Thus, electrons traveling from the gun to various points on the tube face will travel different distances. The maximum distances traveled occurs at the corners, while the minimum distance traversed is at the center of the screen. Since the electron beam is subjected to a predetermined deflection waveform, the electrons traveling the longer distance are deflected a greater amount. This produces a distortion of the desired rectangular raster shape which is increasingly severe as the beam moves from the center of the tube to the top and bottom or sides. One form of this distortion is illustrated by the solid lines of FIG. 1 and is commonly referred to as pincushion distortion.

It is apparent that this distortion can occur simultaneously in the vertical as well as the horizontal direction, and is known as top and bottom pincushion and side pincushion distortion respectively.

One method to correct this undesirable distortion is to design a deflection yoke which will provide a deflection field to deflect the electron beam in the desired raster shape. This technique is however only partially effective, and in wide angle color tubes, it does not provide the needed degree of correction. Another technique presently employed is to add a current component of the horizontal frequency to the vertical deflection waveform to correct for top and bottom pincushion and to amplitude modulate at a vertical frequency the horizontal deflection waveform to correct for side pincushion distortion.

Fat. Nos. 3,329,859 issued to E. Lemke and 3,408,535 issued to E. Lemke each assigned to the present assignee disclose separate circuits for top and bottom and side pincushion correction respectively. Although these circuits provide the necessary bilateral correction if both are incorporated into a television receiver, they each employ a saturable reactor and associated circuitry and are somewhat costly. An embodiment of the present invention utilizes a single saturable reactor to provide simultaneous correction of both top and bottom and side pincushion distortion. This circuit reduces the complexity and cost of the separate circuits. Also, the circuit embodying the present invention displays independence of control, so that the top and bottom pincushion voltage can be adjusted without serious effect to the side pincushion correction. Further, circuits embodying the present invention require no direct current or permanent magnet biasing. This eliminates the costly factory adjustment where a permanent magnet is employed as in prior circuit arrangements.

A single device pincushion circuit has been proposed utilizing a tuned circuit to develop the top and bottom correction voltage which, unlike the present system, resonates at a frequency unequal to the horizontal oscillator frequency; also, no impedance network is utilized to provide independence of control. Further, the proposed system shifts the voltage induced in a center winding of a saturable reactor approximately 180° and then applies the resultant sawtooth voltage to the vertical deflection coils. The present system however provides a sinusoidal voltage at approximately the horizontal frequency (e.g., 15,734 Hertz) which is shifted only approximately 110° from the flux in the center winding of the saturable reactor. The required correction current waveform is then derived by applying this signal to the vertical deflection coils.

Raster distortion correcting circuits embodying the present invention include a saturable reactor having outer windings serially coupled in relation to each other, the combination coupled in parallel relationship to a horizontal deflection winding of a television receiver and a control winding serially coupled to the vertical deflection windings to conduct vertical deflection current. The outer windings are arranged to induce a horizontal frequency current in the control winding which varies in magnitude and is alternately poled at the vertical frequency rate. The vertical frequency current flowing in the control winding varies the inductance of the outer windings at the vertical frequency rate to provide side pincushion correction. A series resonant circuit tuned to the horizontal frequency is coupled to the control winding and develops a voltage at the horizontal frequency, a portion of which is coupled to the vertical deflection winding to correct for top and bottom pincushion distortion. An impedance network is coupled to the control winding and to the resonant circuit. The tuned circuit includes frequency adjusting means and means for varying the amplitude of correction voltage applied to the vertical deflection winding.

Further advantages as well as an explanation of the present invention can be obtained by reference to the figures and description thereof which follows.

Figure 1:
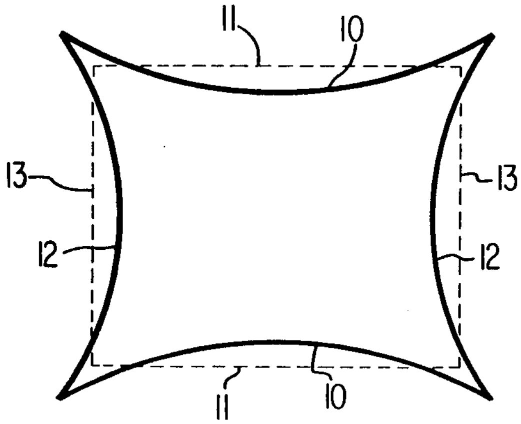
FIG. 1 is an illustration of the outer boundaries of a television receiver having top and bottom as well as side pincushion distortion.

Referring to FIG. 1, solid lines 10 illustrate top and bottom pincushion distortion at the upper and lower boundaries of the raster. It is noted that as the beam moves toward the center, this distortion is less severe. Solid lines 12 illustrate side pincushion distortion at the side boundaries of a picture tube and again as the beam is moved toward the center of the tube this distortion is less severe. Dotted lines 11 and 13 illustrate the corrected raster in the top and bottom and side directions respectively which is desirable for viewing and results when the present invention is employed to correct the pincushion distortion.

Figure 2:
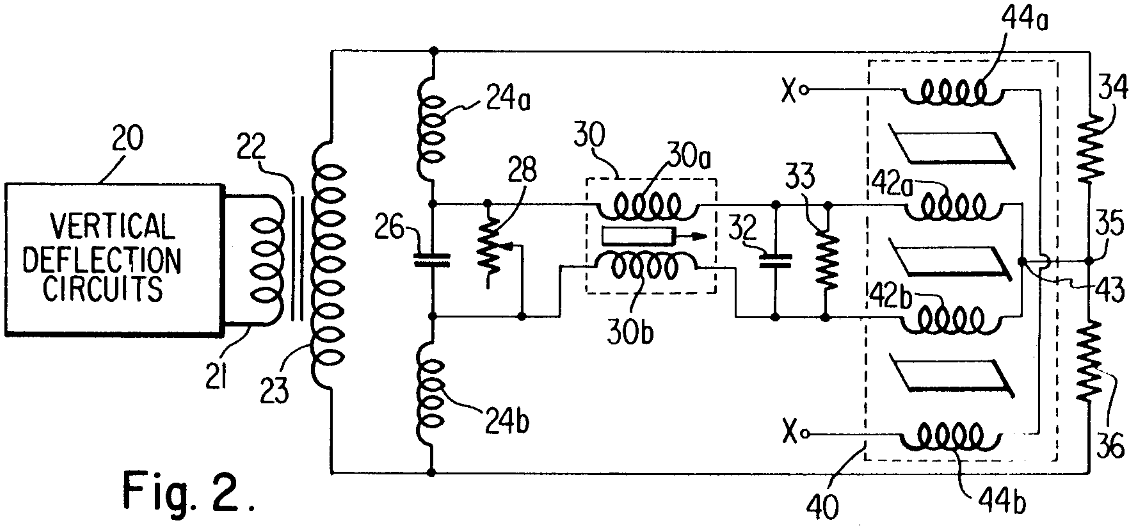
FIG. 2 is a schematic diagram partially in block form showing a circuit embodying the present invention.

FIG. 2 shows a particular embodiment of the present invention. It is understood that the circuit is incorporated within a television receiver having conventional RF, IF, A.F. chrominance, luminance and deflection circuitry which is not shown. Block 20 includes the vertical oscillator and output stages which are coupled to vertical deflection windings **24*a* and 24*b* by means of an output transformer 22 having a primary winding 21 coupled to the output stage and a secondary winding 23 having its end terminals coupled to the vertical deflection windings as shown. The use of the output transformer 22 is illustrative only and other techniques for applying vertical deflection current are well known and may be employed. Vertical frequency current flowing in a vertical deflection winding 24*a* passes through a winding 30*a* of the split inductor 30 and through a control winding 42*a* and 42*b* in a saturable reactor 40. This current is returned to a vertical deflection winding 24*b* through winding 30*b* of the split inductor 30**.

Other current paths including a capacitor 26, a resistor 28, a capacitor 32, a resistor 33 and resistors 34 and 36 appear as relatively large impedances at the vertical frequency in relation to the series impedance path described; thus the vertical frequency current will flow for the most part in the series path including the control winding **42*a* and 42*b* of saturable reactor 40. The horizontal frequency voltage developed across an impedance including a resistor 33 and a capacitor 32 by current from the control winding 42*a* and 42*b*, as will be described with reference to FIGS. 3 and 4 below, is coupled to a series tuned circuit including a capacitor 26 and a split inductor bifilar having bifilar windings 30a and 30b. A variable resistor 28 is coupled in parallel relation to capacitor 26 to provide an adjustment of the magnitude of voltage appearing across capacitor 26 and thus the amount of top and bottom pincushion correction desired. Inductor 30** includes means for adjustment which serves to vary the resonant frequency of the tuned circuit.

Terminals X—X couple outer bifilar windings 44a and 44b of transformer 40 in parallel relationship to the horizontal deflection winding (not shown) and a horizontal shunt current ($I_h$) flows through these outer windings. Resistors 34 and 36 are parallely coupled to vertical deflection windings 24a and 24b, respectively by means of an interconnection from a terminal 35 to a terminal 43, windings 42a and 42b and inductor windings 30a and 30b respectively, and are utilized as vertical yoke damping resistors. The bifilar windings serve to provide a balanced load on vertical yoke segments 24a and 24b.

Figure 3:
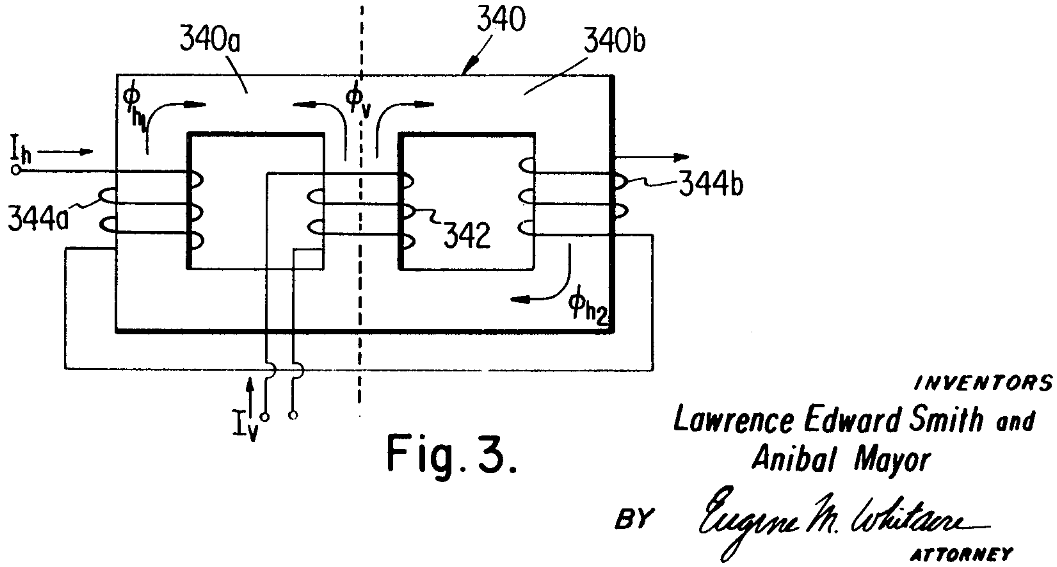
FIG. 3 depicts diagrammatically a form of the saturable reactor utilized in the circuit of FIG. 2.

Top and bottom pincushion correction is obtained in the following manner. Referring to FIG. 3, it is seen that windings 344a and 344b (corresponding to windings 44a and 44b of FIG. 2 respectively) are wound on reactor core 340 such that if no vertical current $I_v$ is flowing in control winding 342 the voltages induced in winding 342 by current $I_h$ flowing in outer windings 344a and 344b will tend to cancel. This is illustrated by the direction of fluxes produced by $I_h$ and represented by $\Phi h_1$ and $\Phi h_2$ in the figure which are of opposite direction and therefore cancel in the center leg of transformer 340. As vertical current represented by $I_v$ in FIG. 3 is applied to control winding 342, (which corresponds to windings 42a and 42b in FIG. 2) a magnetic flux varying in magnitude and direction at the vertical deflection rate illustrated by $\Phi v$ is created. It is seen that this flux will tend to cancel $\Phi h_1$ and add to $\Phi h_2$ in the outer legs 340a and 340b respectively of the transformer 340. As the direction of $\Phi v$ reverses, the flux will add to $\Phi h_1$ and oppose $\Phi h_2$. The leg in which the fluxes are additive tends to saturate. As this occurs, transformer action coupling horizontal frequency signals to the control winding takes place between the outer leg coupled to the center leg by the other unsaturated core member. This is possible since the flux density in the unsaturated core is varying at the horizontal deflection rate.

Considering the vertical current $I_v$ relatively constant as compared to the higher frequency horizontal current $I_h$, as $I_h$ changes directions at the horizontal deflection rate, windings 344a and 344b will alternately be effectively coupled to control windings 342, since core leg 340a and 340b will saturate, alternately when vertical flux $\Phi_v$ and fluxes $\Phi h_1$ and $\Phi h_2$ add respectively. Thus, the current produced in control winding 342 by current $I_h$ will combine with the vertical deflection rate current present in winding 342. As the vertical current $I_v$ changes polarity at the center of vertical scan, the induced current will also change polarity, since saturation of core halves 340a and 340b are reversed for a given polarity of horizontal frequency current.

Figures 4A, 4B, 4C, 4D:
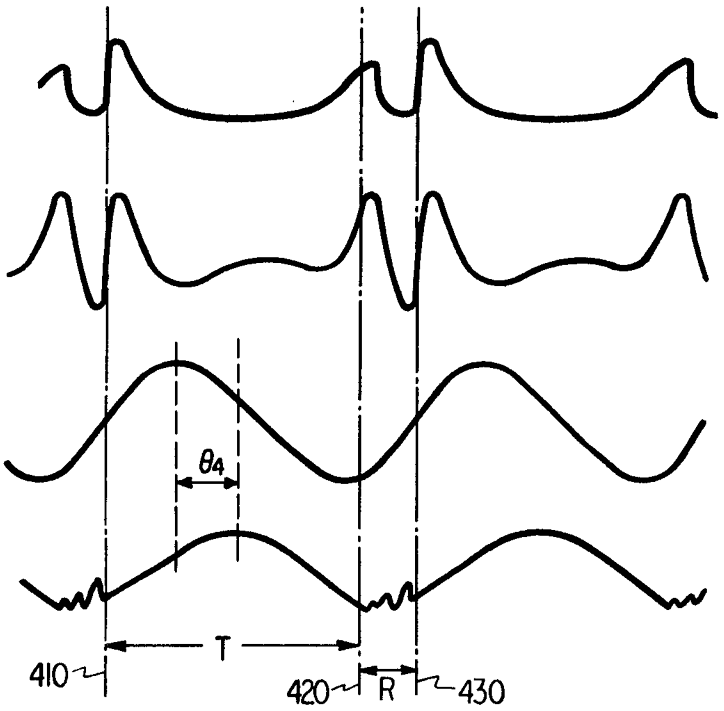
FIG. 4 shows representative waveforms at various points in the circuit of FIG. 2.

FIG. 4, waveform A illustrates the waveform of horizontal rate current induced in winding 342 and is referred to as $I_A$ below. The vertical deflection current remains essentially constant during each horizontal deflection cycle. Vertical line 410 common to FIGS. 4a, 4b, 4c 4d, represents the beginning of horizontal trace where the horizontal shunt current $I_h$ is maximum in a first direction. It is seen in FIG. 3 that, if $I_h$ as illustrated thereon, is in the first direction, winding 344a is coupled to winding 342, since $\Phi_v$ and $\Phi h_2$ add to saturate core portion 340b. As $I_h$ decreases toward zero during trace, $I_A$ decreases to a minimum value during the trace interval illustrated by the time period T between lines 410 and 420 in FIG. 4. As $I_h$ reverses polarity and is increasing, winding 344b is now coupled to winding 342 in FIG. 3 so that $\Phi h_1$ will now add to $\Phi_v$ and saturate core portions 340a as $I_h$ increases, $I_A$ will then increase as illustrated by the latter portion of the trace interval T of waveform A of FIG. 4. The time sequence between vertical lines 420 and 430 represents the retrace portion (R) of horizontal scan. When the vertical current $I_v$ reverses polarity, waveform A of FIG. 4 will be inverted. Further, as the vertical current magnitude changes over a period of successive horizontal lines, the magnitude of current peaks on waveform A of the figure will increase to a maximum value at the beginning and end of vertical trace. The waveform illustrated was taken during the upper portion of raster scan. The net current flowing in winding 342 of FIG. 3 and windings 42a and 42b of FIG. 2 is the sum of the vertical deflection current $I_v$ and the pincushion correction current $I_A$, and as FIG. 4a illustrates is not of proper phase to effect the necessary pincushion correction and must therefore be modified.

Figure 5:
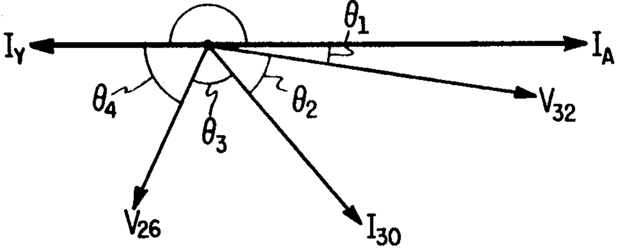
FIG. 5 is a phase diagram illustrating the phase relationships of various currents and voltages in the system.

Referring to FIG. 2, current $I_A$ is applied to a parallely coupled R–C network comprising elements 32 and 33. This network provides a phase shifting function, as well as rolling off undesirable high-frequency components of the top and bottom pincushion correction voltage waveform. This network coupled in conjunction with inductor 30, capacitor 26 and resistor 28 provides a constant and nearly resistive load to horizontal frequency signals induced in control windings 42a and 42b. Thus, as the amplitude and phase of the top and bottom pincushion signal is adjusted by varying resistor 28 and inductor 30, the side pincushion correction remains relatively unchanged. FIG. 4b illustrates the voltage across the impedance network. It is seen that by observing the intersection of line 410 with waveforms 4a and 4b that the voltage peak of waveform 4b lags the current peak of waveform 4a by several degrees. This phase shift is graphically illustrated in FIG. 5 as angle $\theta_1$ in the phase diagram. It is noted that $I_A$ is taken as the reference line and $\theta_1$ is in a direction defined to be a lagging phase angle. The magnitudes of the various phasors in FIG. 5 are merely illustrative and not related to the actual magnitudes of voltages and currents present. $V_{32}$ associated with angle $\theta_1$ represents the voltage across capacitor 32 and lags $I_A$. $\theta_1$ may typically be approximately 7°. This phase shift is not in itself sufficient to provide the necessary correction waveform. The voltage is therefore applied to a series resonant circuit comprising inductor 30 and capacitor 26 in FIG. 2 which resonates at approximately the horizontal deflection frequency.

A current flows in the inductor 30 illustrated $I_{30}$ in FIG. 5 which results from the application of voltage $V_{32}$ to the resonant circuit. It is seen in FIG. 5 that $I_{30}$ lags $V_{32}$ by an angle $\theta_2$ which is typically in the neighborhood of 40°.

Voltage appearing across series capacitor 26 which is serially coupled to vertical deflection windings 24a and 24b can be greater than the voltage applied to the tuned circuit as is well known, and a larger pincushion correction voltage is obtained by utilizing this coupling method. Resistor 28 provides a top and bottom pincushion correction magnitude adjustment. Inductor 30 is variable to provide tuning of the series resonant circuit for proper phase adjustment or top and bottom pincushion correction centering. The correction voltage waveform appearing across capacitor 26 is illustrated in FIG. 4c. This voltage is sinusoidal in form, and has its null voltage occurring approximately at the beginning of scan (line 410). $V_{26}$ associated with $\theta_3$ in FIG. 5 illustrated the phase relationship of this voltage to the other currents and voltages in the system. $\theta_3$ may typically be 70°. The pincushion correction current produced by this voltage when applied to the vertical deflection windings 24a and 24b is illustrated by the current waveform of FIG. 4d. The phase shift of this current is illustrated by $\theta_4$ in FIGS. 4 and 5. In FIG. 4d it is seen that the waveshape is approximately sinusoidal with the exception of the retrace interval R, and the current lags the voltage of waveform 4c by and angle $\theta_4$ illustrated in FIG. 4c and 4d by the interval between the connecting dotted lines. Further in FIG. 5, it is seen that the application of voltage $V_{26}$ to the vertical deflection windings produces this current illustrated as $I_v$ in the figure which is shifted in phase by an angle $\theta_4$ to produce the necessary pincushion correction waveform. It is recalled that the waveforms of FIG. 4 represent currents and voltages at the top of the raster in the vertical scanning interval and include a horizontal scanning period only. The familiar bow tie shape waveform results (not illustrated here) when the waveform 4*c* is observed over several vertical scanning intervals.

Turning now to the side pincushion correction features of the present invention and referring to FIGS. 2 and 3, it is recalled that vertical deflection current of generally sawtooth shape flows through control winding 342 of FIG. 3. This current $I_v$ produces a flux illustrated as $\theta_v$ in FIG. 3 which tends to saturate both core halves 340*a* and 340*b* as vertical current magnitude is increased during each vertical deflection cycle. Thus, as $I_v$ reaches a maximum value at the top and bottom of the raster, the total inductance of outer windings 344*a* and 344*b* will decrease, since the permeability of the core halves 340*a* and 340*b* has decreased as $\theta_v$ tends to saturate these core halves. It is noted that the horizontal current $I_h$ flowing in outer windings 344*a* and 344*b* will have some effect on the total inductance of these windings, but the variation in response to $\theta_v$ is greater and is controlling. Since saturable reactor 340 utilized no fixed magnetic bias, and since the core material displays nonlinear permeability characteristics. The sawtooth shaped current $I_v$ will produce approximately a parabolic change in the inductance of windings 44*a* and 44*b* of FIG, 2. The inductance of windings 44*a* and 44*b* will be minimum at the top and bottom of each raster when the magnitude of $I_v$ is maximum and will be maximum when $I_v$ is zero in the center of the raster. Since this variable inductance is coupled in parallel relation to the horizontal deflection winding by means of terminals X—X in FIG. 2, a shunting current $I_h$ will flow through windings 44*a* and 44*b*. $I_h$ varies in response to the nearly parabolic change in inductance and is at a maximum at the top and bottom edges of the raster scanned and decreases to a minimum at the center.

This induction, coupled to the horizontal deflection circuit and having a magnitude varying in nearly parabolic fashion at the vertical deflection rate, produces the desired side pincushion correction by varying the loading on the horizontal deflection system.

An important feature of the present invention is that it not only provides bilateral pincushion correction, but it does so with a good degree of independence of control. Thus, side pincushion correction fixed by the design of the saturable reactor 340 is affected a minimum amount when the top and bottom pincushion controls (resistor 28 and inductor 30 of FIG. 2) are changed. This is accomplished with the addition of resistor 33 and capacitor 32 in the figure which aids in maintaining a constant impedance load on control windings 42*a* and 42*b* of FIG. 2. It is further noted that inductor 30 of FIG. 2 does not serve as an integrating coil but is utilized in conjunction with capacitor 26 to provide a resonant circuit load for control windings 42*a* and 42*b* of FIG. 2.

Figure 6:
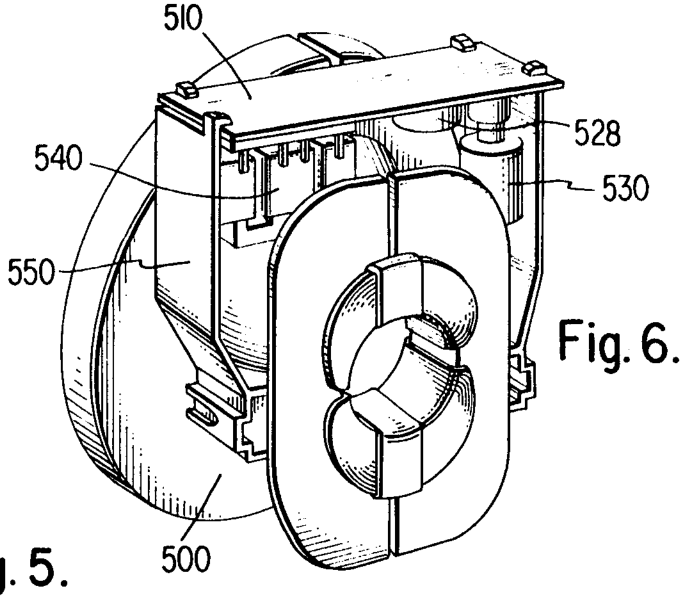
FIG. 6 illustrates a convenient mounting scheme for the circuitry embodying the present invention.

FIG. 6 illustrates a convenient method of mounting the circuitry of FIG. 2 on the deflection yoke of a television receiver. Inductor 30 of FIG. 2 is illustrated as part 530 in FIG. 6 mounted on a printed circuit board 510. Also mounted on the circuit board 510 is saturable reactor 540 and resistor 528 corresponding to reactor 40 and resistor 28 in FIG. 2. The yoke 500 includes the horizontal and vertical deflection windings and frame 550 serves as a mounting structure for circuit board 510.

Parameter values utilized in the circuit of FIG. 2 include:

| | | |
|---|---|---|
| Capacitors | 26 | .068 microfarads. |
| | 32 | .12 microfarads |
| Resistors | 28 | 2000 ohms. |
| | 33 | 68 ohms. |
| | 34 | 68 ohms. |
| | 36 | 68 ohms. |
| Inductor | 30 | .9–2.5 milli henries (nominally 1.7 mh). |
| Saturable reactor | 40 | |
| Windings | 42a, 42b | 15½ turns, 26 AWG .15 ohms ea. |
| | 44a, 44b | 90 turns, 30AWG 1.35 ohms ea. Ferrite core—RCA 540 mix |

What is claimed is:

1. A bilateral pincushion correction circuit in a television deflection system comprising:
   a saturable reactor having control and outer windings, said control winding serially coupled to a vertical deflection winding in a television receiver, said outer windings coupled in series relation, said series coupled outer windings coupled in parallel relation to a horizontal deflection winding in said television receiver wherein vertical deflection current flowing in said control winding varies the inductance of said serially coupled outer windings in a parabolic fashion at the vertical deflection frequency and wherein horizontal frequency current flowing in said outer windings induces a horizontal frequency current in said control winding;
   series resonant circuit means coupled to said control winding on said saturable reactor and having at least one reactive element coupled in series relation to said vertical deflection winding for developing a voltage at the horizontal scanning frequency in response to said horizontal deflection frequency current flowing in said control winding;
   resistive means coupled in parallel relation to said reactive element for varying said horizontal frequency voltage developed across said reactive element; and
   an impedance network coupled to said control winding and to said series resonant circuit.

2. A circuit as defined in claim 1 wherein said saturable reactor comprises:
   a two window saturable reactor comprised of two jointly coupled E-type cores having said control winding wound on a center leg and said outer windings wound on outer legs.

3. A circuit as defined in claim 1 wherein said series resonant circuit means comprises a variable inductor serially coupled to a capacitor the combination having a resonant period approximately equal to the horizontal deflection scanning period.

4. A circuit as defined in claim 1 wherein said impedance network comprises:
   resistive means coupled in parallel relation to capacitive means, the parallel combination coupled in parallel relation to said control winding.

5. In a television receiver including horizontal and vertical deflection windings and respective sources of horizontal and vertical deflection current for energizing said windings, a bilateral pincushion correction circuit comprising:
   a saturable reactor having first windings energized by said horizontal deflection current source and a control winding serially coupled to said vertical deflection winding and through which vertical deflection current flows;
   first impedance means coupled across said control winding; and
   a series resonant circuit tuned to the horizontal deflection frequency comprising an inductor and a capacitor coupled across said first impedance means, said capacitor coupled in series relation to said vertical deflection windings, and
   second impedance means coupled in parallel relationship with said capacitor.

6. A circuit as defined in claim 5 wherein said outer windings on said saturable reactor are wound in series such that flux produced by each winding by current flowing therein tends to cancel in a center leg of said saturable reactor.

7. A circuit as defined in claim 5 wherein the combination of said series resonant circuit and said impedance network presents a relatively constant load on said control winding.

8. A circuit as defined in claim 5 wherein said saturable reactor further comprises:
   a two window ferrite core having center and outer legs upon which said control and outer winding are wound respectively.

9. In a television receiver including horizontal and vertical deflection windings and respective sources of horizontal and vertical deflection current for energizing said windings, a bilateral pincushion correction circuit comprising:

a saturable reactor having first windings energized by said horizontal deflection current source and a control winding serially coupled to said vertical deflection winding and through which vertical deflection current flows;

an impedance network coupled across said control winding; and a series resonant circuit tuned to the horizontal deflection frequency, said series resonant circuit comprising capacitive means shunted by resistive means to vary the magnitude of correction voltage applied to said vertical deflection winding, and an inductor having bifilar windings and means for varying the inductance to vary the resonant period of said resonant circuit; said series resonant circuit coupled to said control winding and to said vertical deflection windings.

10. A circuit as defined in claim 9 wherein said capacitive means is coupled in series relation to said vertical deflection winding.